Sept. 17, 1929.   G. McDANIEL   1,728,427
CHILD'S VEHICLE
Filed April 20, 1928    2 Sheets-Sheet 1
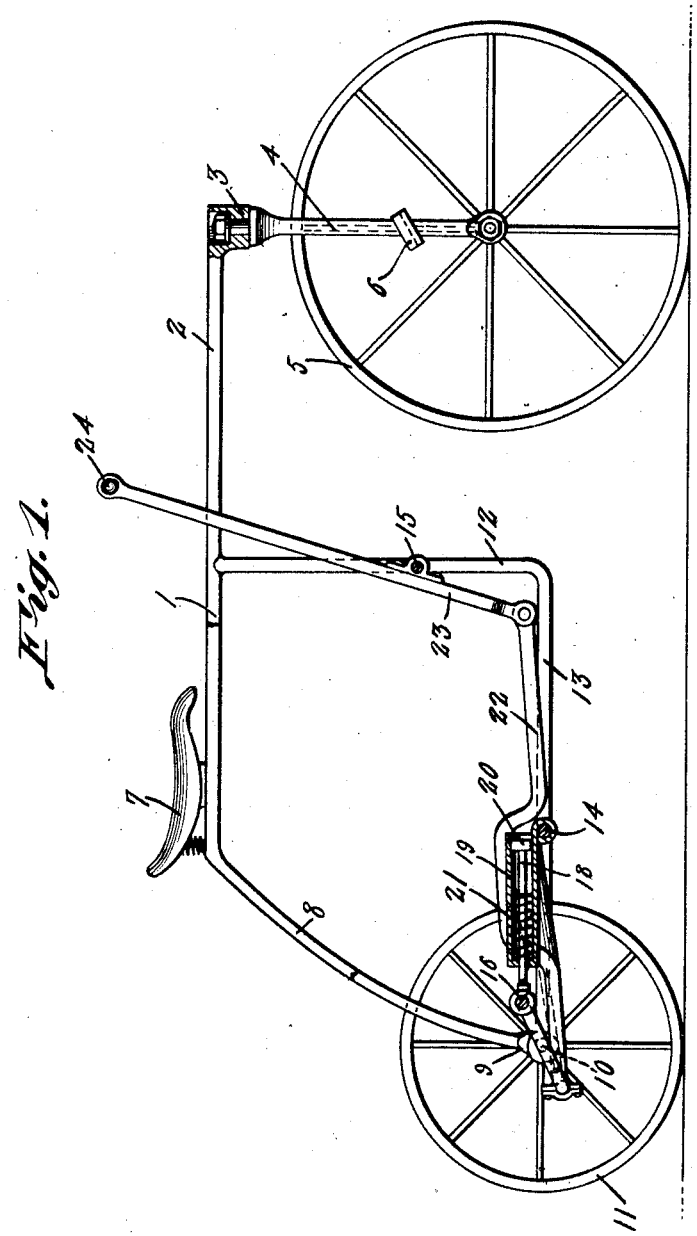
George McDaniel, Inventor

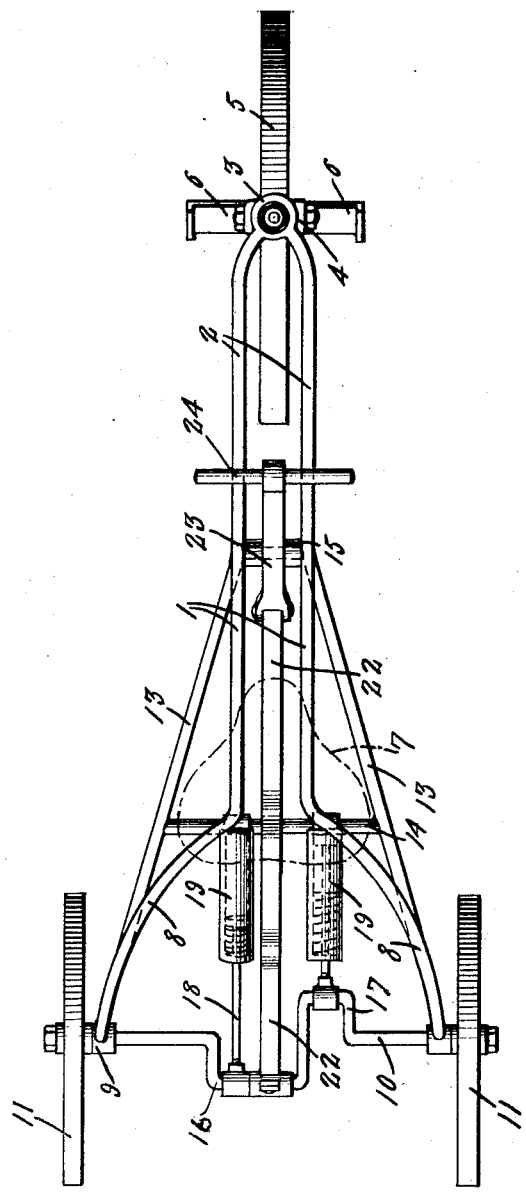

Patented Sept. 17, 1929

1,728,427

UNITED STATES PATENT OFFICE

GEORGE McDANIEL, OF SEMINOLE, OKLAHOMA

CHILD'S VEHICLE

Application filed April 20, 1928. Serial No. 271,510.

This invention relates to a child's vehicle, one of the objects being to provide a light and durable device of this character adapted to be steered by the feet of the rider and propelled by the use of a hand lever, means being combined with said lever whereby the propelling mechanism is kept normally away from a dead center so that it is thus possible at all times to operate the vehicle from a standing position.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a view of the vehicle, the same being partly in side elevation and partly in section.

Figure 2 is a top plan view.

Referring to the figures by characters of reference 1 designates the frame of the vehicle including a forwardly extending tongue 2 provided with a bearing 3 at its front end in which is pivotally mounted the post 4 of the front wheel 5. Foot rests 6 are extended laterally from the ports and can be reached by the occupant of the saddle 7 mounted on the rear portion of the frame 1.

The rear portion of the frame 1 is spread downwardly as shown at 8 to provide spaced bearings 9 in which is journalled the rear axle 10 of the vehicle, this axle being secured to and supported by the wheels 11. Frame 1 also has a depending portion 12 the lower part of which diverges rearwardly as at 13, the rear ends of the diverging portion being connected to the lower ends of the portion 8 of the frame 1. These rearwardly extending portions 13 are connected by a cross rod 14 and bearing pin 15 is mounted within the depending frame 12.

The axle 10 is provided with oppositely extending cranks 16 and 17 each of which is connected to a pitman 18. Each pitman is slidably mounted in a cylinder 19 pivoted on the rod 14, there being a head 20 on the pitman. That end of each cylinder nearest to the axle is closed and constitutes a thrust bearing for coiled spring 21 located in the cylinder and through which the pitman 18 extends. The crank 16 is also connected to an operating pitman 22 which is pivotally attached to the lower end of a lever 23, this lever being fulcrumed on the pin 15 as shown and being provided at its upper end with a handle 24 which can be reached conveniently by the occupant of the saddle 7.

In practice the user of the vehicle rests on the seat 7 with the feet bearing on the foot rests 6. Lever 23 is operated by pulling and pushing on the handle 24. Each time the handle is pulled toward the user the pitman 22 pulls on the crank 16 engaged thereby and causes the heads 20 to travel in opposite directions in the cylinders 19. The parts are so proportioned that during the first half of each stroke of the pitman 22 one of the heads 20 will move toward the adjacent spring 21 while the other head 20, which has been holding its spring under compression, will gradually release the spring. During the other half of said stroke of the pitman 22, the last named head will move away from the spring which has been held under compression while the other head 20 will move against and compress the spring in the path thereof.

It will be seen that whenever the vehicle is brought to a rest, the spring 21 which is under compression will exert a thrust against the head 20 contacted thereby so as to cause the axle 10 to rotate and bring the crank 16 out of a dead center position. Consequently whenever the vehicle is placed on the ground the cranks will be in position where they can be started simply by pulling on the handle 24 or thrusting thereagainst.

The action of the springs on the head 20 will also facilitate the operation of the vehicle the momentum of which will act to successively compress the spring which, in turn, will be allowed to expand and thrust against the head.

What is claimed is:

A child's vehicle including a frame, a steering wheel at the front end thereof, a wheel supported crank axle at the rear of the frame, cylinders pivotally mounted in the frame, heads mounted for reciprocation therein, pitman connections between the heads and the respective cranks of the axle, compression springs in the cylinders each adapted to be successively engaged and compresed by and thereafter released from one of the heads, thereby to hold the cranks off of a dead center, an actuating lever pivotally mounted in the frame, and a pitman connection between said lever and one of the cranks of the axle, said cranks being movable during a portion of the rotation of the axle without being subjected to restraining action exerted by the springs.

In testimony that I claim the foregoing as my own, I have hereto affixed my signature.

GEORGE McDANIEL.